United States Patent [19]

Nishida et al.

[11] Patent Number: 4,547,848

[45] Date of Patent: Oct. 15, 1985

[54] ACCESS CONTROL PROCESSING SYSTEM IN COMPUTER SYSTEM

[75] Inventors: Hidehiko Nishida, Tokyo; Minoru Koshino, Yokohama; Terutaka Tateishi, Kawasaki; Akira Hattori, Yokohama, all of Japan

[73] Assignee: Fujitsu Limited, Kawasaki, Japan

[21] Appl. No.: 509,869

[22] Filed: Jun. 30, 1983

[30] Foreign Application Priority Data

Jun. 30, 1982 [JP] Japan .................. 57-112862

[51] Int. Cl.[4] ......................................... G06F 13/00
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 3,949,369 | 4/1976 | Churchill, Jr. ................. | 364/200 |
| 4,037,214 | 7/1977 | Birney et al. ................... | 364/200 |
| 4,280,176 | 7/1981 | Tan ................................. | 364/200 |
| 4,314,335 | 2/1982 | Pezzi ............................... | 364/200 |
| 4,453,216 | 6/1984 | Chiba et al. .................... | 364/200 |

*Primary Examiner*—Raulfe B. Zache
*Assistant Examiner*—William G. Niessen
*Attorney, Agent, or Firm*—Staas & Halsey

[57] ABSTRACT

This invention relates to a system for processing access requests issued from a plurality of access requesting units to a memory. In particular, in a storage system where the buffer storage BS and main storage MS are provided, access is first made to BS based on and access request and if the desired data is not found in BS, access is made to MS. When the desired data is not found in BS and access is then made to MS, acces to BS is carried out based on the next access request from the same access requesting unit in parallel with the access to MS by the first access request.

7 Claims, 3 Drawing Figures

4,547,848

ACCESS CONTROL PROCESSING SYSTEM IN COMPUTER SYSTEM

BACKGROUND OF THE INVENTION

This invention relates to an access request control system for one or more access requesting units in a computer system making accesses to a memory, more particularly, to a memory with a high speed, small capacity buffer storage (BS) and low speed large capacity main storage (MS).

Access to memory is conventionally made by an access request from each access requesting unit which is sent to a corresponding register. When access requests compete, one of the access requests is selected in accordance with a priority determination method. Once an access request is selected, BS is accessed. If BS does not have the desired data, MS is accessed. The access to MS requires a considerably longer period of time than an access to BS.

In the prior art, an access request is held in the register while MS is accessed and the corresponding access requesting unit can not issue the next access request during such holding period. Therefore, even when the next access request data exists in BS, such data in BS can not be accessed until the preceding MS is accessed, resulting in poor efficiency.

SUMMARY OF THE INVENTION

It is an object of this invention to overcome the above disadvantage, and in particular, to make possible an access to BS by the next access request from the same access requesting unit while the access request to MS is being made by the first access request.

For this purpose, according to this invention, an access request is transferred to a register for access to MS when an MS access becomes necessary and the register for access to BS is released. Priority for processing accesses to BS and MS are processed separately in BS and MS priority determination circuits. Access requests which are not processed due to busy states, etc. are returned to be re-prioritized by the BS priority determination circuit.

DESCRIPTION OF THE PREFERRED EMBODIMENT

Figure 1:
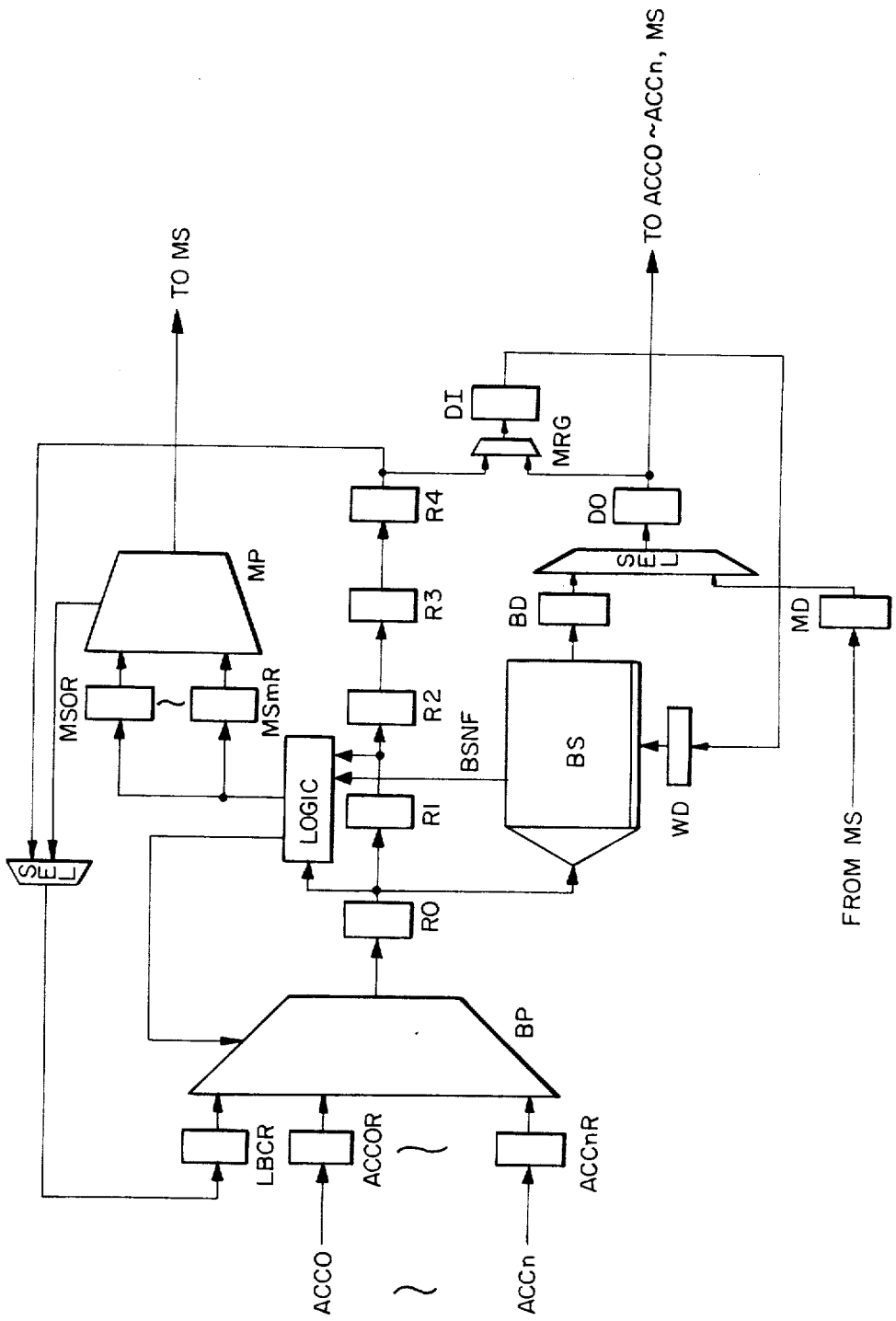
FIG. 1 is a block diagram of an embodiment of this invention.

FIG. 1 is a block diagram of an embodiment of this invention. Labels ACC0-ACCn indicate requests by access requesting units. Blocks ACC0R-ACCnR are corresponding BS access registers. Block LBCR is a loop back circuit register. Each access request is selected in the BS priority determination circuit BP and is then issued to BS. If the requested operand is not found in BS, the access request is sent to the MS access registers MS0R-MSmR controlled by the BSNF (BS not found) signal. Here, the registers MS0R-MSmR may be common to all access requesting units or may be plural registers corresponding to each access requesting unit, i.e., one or more MS registers may correspond to one access requesting unit. When an access request is sent to registers MS0R-MSmR, the BS access register of the corresponding access requesting unit is released and becomes ready for accepting the next access request. The access sent to MS0R-MSmR undergoes another selection process by the MS priority determination circuit MP and is then issued to MS. Meanwhile, access requests in ACC0R-ACCnR are issued to BS by BP which considers the newly accepted access request. If MS0R-MSmR are used in common by the access requesting units, when MS0R-MSmR become busy, the access request initiated by BSNF during the BS access is nullified until one or more MS registers becomes available. If one or more of the MS registers correspond to an access requesting unit, a busy MS register results in the access request in the corresponding BS register being nullified until a corresponding MS register becomes vacant.

In FIG. 1, R0-R4 are registers forming a pipeline. Block BD is a buffer data read register of BS, WD is a write data register of BS and MD is a main storage data read register for MS. Blocks D0 and D1 are data register, SEL is a selector and MRG is a merge circuit used for a partial write. The operation in relation to BS are already known and not directly related to this invention. Therefore these operations are not described in detail in this specification.

Figure 2:
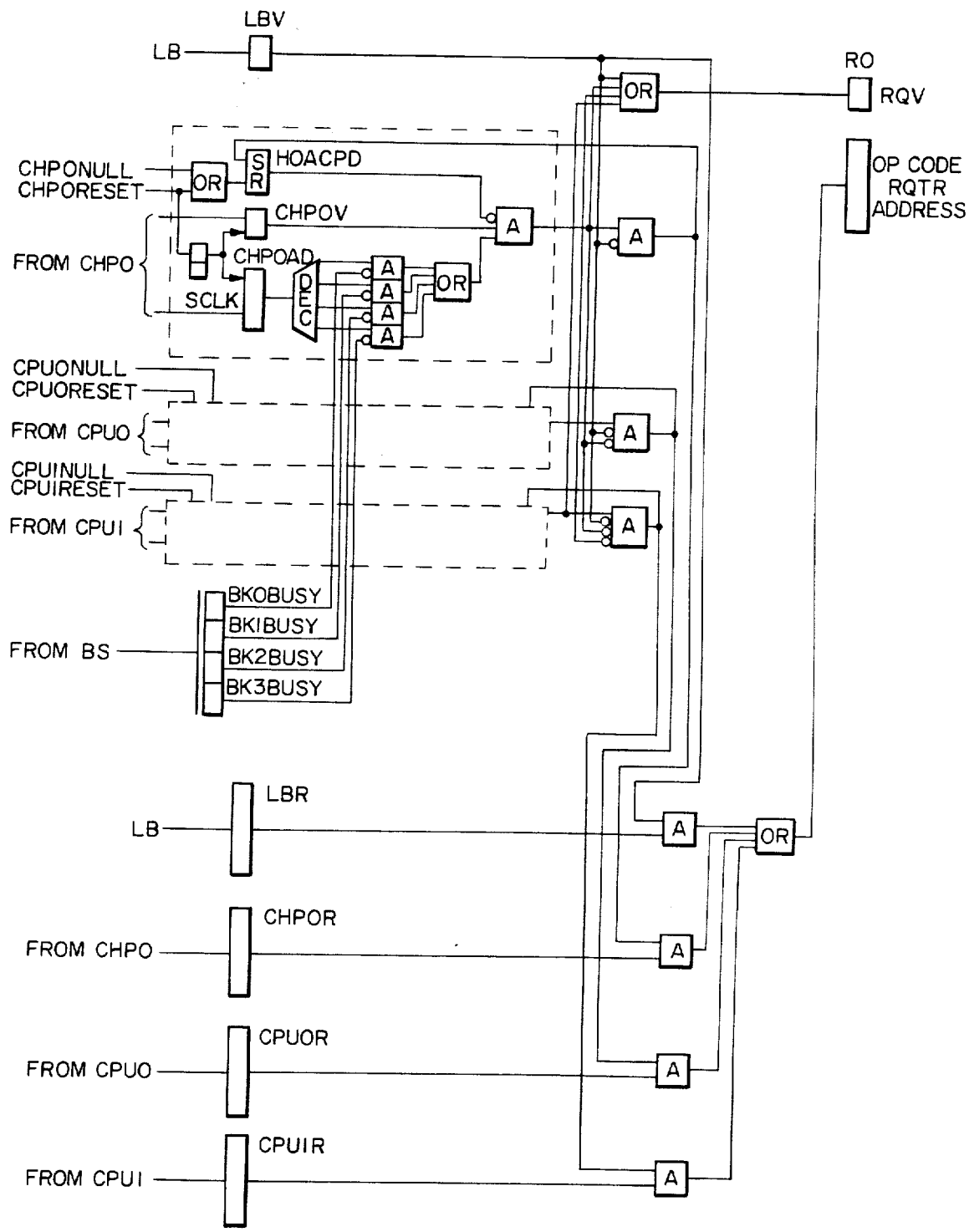
FIG. 2 is a detailed schematic diagram of the priority determination circuit BP of the BS in FIG. 1.
Figure 3:
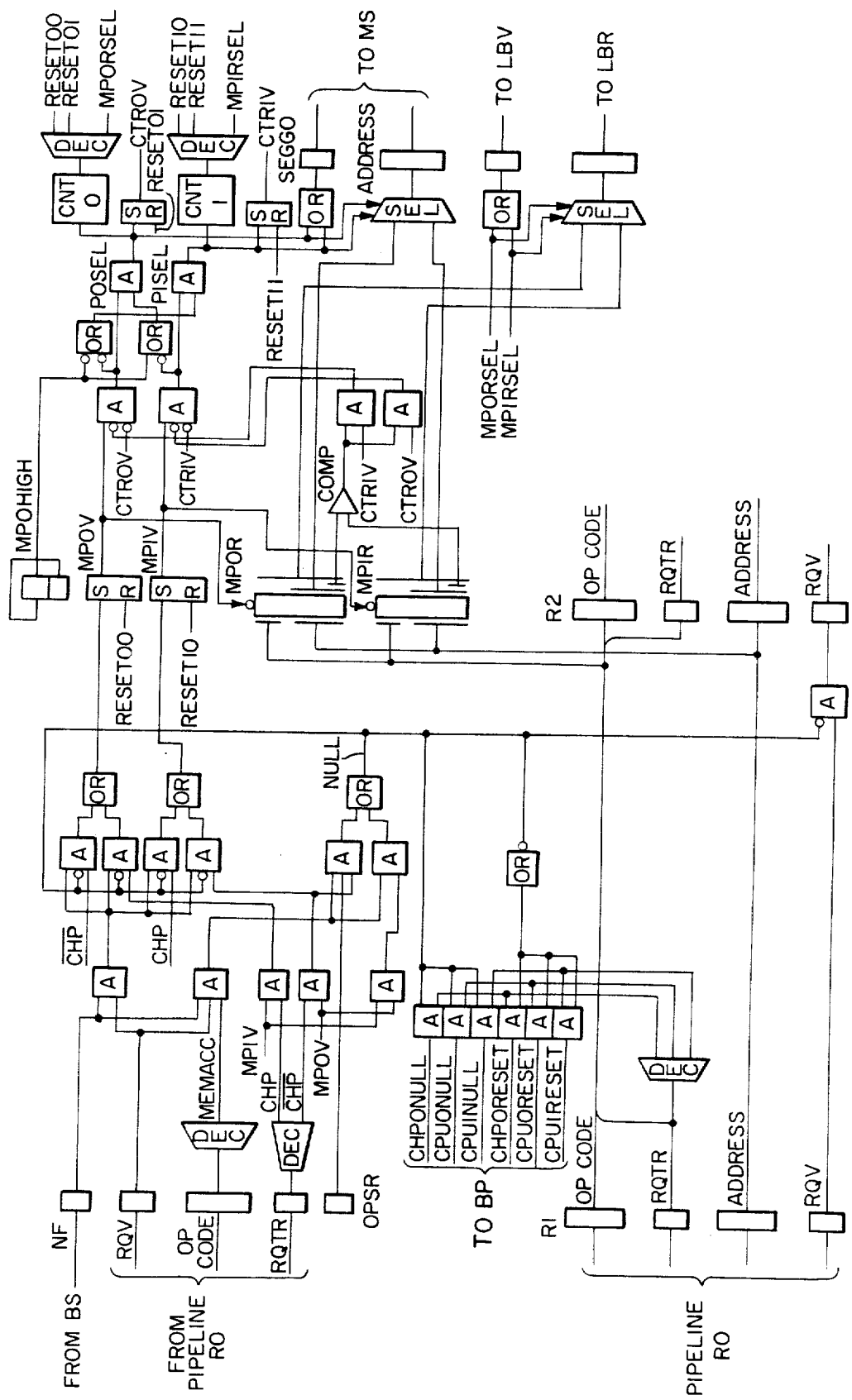
FIG. 3 is a detailed schematic diagram of the priority determination circuit MP of the MS and its control circuit LOGIC in FIG. 1.

Detail of the BS priority determination circuit BP is described by referring to FIG. 2, and the MS priority determination circuit MP and its control circuit LOGIC are described by referring to FIG. 3. FIG. 2 is a detailed block diagram of the BS priority determination circuit BP. In FIG. 2, the access requesting units are composed of two central processing units CPU0 and CPU1 and one channel processing unit CHP0, and BS is composed of four banks.

An access request from CHP0 will be described first. An access request from CHP0 is loaded into the registers CHP0V, CHP0AD and CHP0R corresponding to ACC0R in FIG. 1. CHP0V outputs a validity signal, CHP0AD outputs part of an address for checking the busy condition of a BS bank and CHP0R outputs an instruction code and an address for a request from CHP0. When an access request is received, the contents of CHP0AD are decoded and a busy check of the pertinent bank is carried out. The signal HOACPD indicates that the associated access request has been selected by the priority determination circuit and is being executed. When HOACPD is "1", the associated access request does not take part in priority determination. An access request for which the bank to be used is not busy and the HOACPD signal is "0" takes part in priority determination. In this example, access requests which take part in priority determination include the loop back access request LB (mainly for processing data from MS) and CHP0, CPU0 and CPU1 access requests. Priority is determined according to the sequence indicated below.

LB>CHP0>CPU0>CPU1

An access request from the loop back LB is always selected first. An access request from CHP0 is selected under the condition that there is no request from LB. An access request from CPU0 is selected under the condition that there is no request from LB or CHP0. An access request from CPU1 is selected under the condition that there is no request from LB, CHP0 or CPU0.

When an access request is selected by the priority determination circuit BP, HOACPD is set to "1" and the access request is input to the register R0 of the first stage of the pipeline. The information sent to R0 includes RQV indicating validity of the access reguest, OPCODE indicating an operation, RQTR indicating the access requesting unit and ADDRESS indicating an access operand to be accessed.

As described later, an access request, once selected, is sometimes nullified during execution and in this case, the HOACPD is reset to "0" by the CHP0NULL signal and thereafter the access request can again take part in priority determination. Where there is no possibility of nullification, the register ACC0R may be opened for input and therefore, in such a case, the set clock SCLK is received by the register CHP0AD and the CHP0RESET signal resets HOACPD to "0". When the set clock SCLK is sent to the register CHP0AD, the next access request is received. If there is no next access request, the valid signal CHP0V remains OFF and no CHP access request participates in priority determination. The same operations are also carried out for CPU0 and CPU1. In FIG. 2, A is an AND gate and OR is an OR gate.

An access request issued to the pipeline makes an access to BS (buffer storage) according to its address. When the requested operand is not in BS, the access request is sent to an MS register or access port MSPORT for an access to MS. FIG. 3 is a diagram of the control circuit LOGIC for the MSPORT and the priority determination circuit MP of MS. Access requests are sent to MSPORT's as follows. An access request sent to R0 is shifted to R1. At this time, if the BSNF (not found) signal is sent from BS, it is input to the setting or control circuit LOGIC. In this example, two MSPORT's are used.

The OPCODE is decoded and a memory access signal MEMACC which indicates whether an access to memory is generated. The RQTR is also decoded and the CHP and $\overline{\text{CHP}}$ signal are generated. When the signal sent from the operation status register OPSR is "0", a CHP access request is first sent to MP1 and if MP1 is busy, it is loaded into MP0. A $\overline{\text{CHP}}$ access request is first sent to MP0 and if MP0 is busy, it is sent to MP1. If both MP0 and MP1 are busy, the NULL signal is generated and the access request is nullified. The NULL signal is ANDed with the RQV signal sent from R1 and R2, making RQV "0" and is also sent to the register ACC0R as the CHP0NULL signal. Thereby HOACPD is reset and the access request can again take part in priority determination. When desired data is found in BS, or not found and the access request is accepted by MSPORT, the register ACC0R is released by the CHP0RESET signal and the next access request is accepted.

The content of OPSR may be set at a constant value by a selection signal at the time of Initial Program Loading (IPL) of the computer system or may be set when an overrun occurs from the buffer condition in the channel. When OPSR is "1", the access requests from CHP are loaded in the sequence of MP1, MP0 as in the above case, but the access from $\overline{\text{CHP}}$ is loaded into MP0. If MP0 is in use, the NULL signal is always generated and the access request is nullified. This control causes MP0 to be used in common by $\overline{\text{CHP}}$ access requests and CHP access requests, while MP1 is not used for CPU access requests but only for CHP access requests.

The access requests sent to MSPORT are selected in accordance with priority determination and then output to MS. The addresses sent to MSPORT are compared with the bits determined by interleave of MS and thereby a busy check of MS is carried out. The signals MP0V and MP1V are validity signals of MSPORT and when these are "1", MSPORT is busy. The signals CTR0V and CTR1V are set when access requests in MSPORT are selected in accordance with priority determination and then sent to MS. These indicate that the access request has been sent to MS and the counter CNT0 or CNT1, respectively, is started. When an access request is sent to MSPORT, a busy check of MS is carried out as follows. Namely, when an access request is sent to MS, the MS banks to which accesses have been requested according to the addresses in MSPORT are compared in the comparison circuit COMP and if they match, MS is busy.

If the result of a busy check is OK and the effective signal of the counter is "0", the access request is input to the priority determination circuit MP. Priority is determined by the MP0HIGH signal which is inverted in synchronization with the clock. When MP0HIGH is "0", priority of the access request of MP1V is high, and when MP0HIGH is "1", priority of the access request of MP0V is high. When any access request is selected by the MS priority determination circuit MP, the address corresponding to the access request is selected and sent to MS. Simultaneously, the corresponding counter CNT0 or CNT1 is started. The counter CNT0 or CNT1 is incremented in synchronization with the clock. When the counter value reaches a specified value, MP0RSEL and MP1RSEL are generated by the decoder DEC, and OPCODE, RQTR, ADDRESS, etc. are selected. Thereby, the above signals are sent to the LB port of the BS priority determination circuit BP (FIG. 2). The RESET signals are generated by a value of the counter CNT0 or CNT1 with a timing such that when the data processing from MS terminates, and MP0V, MP1V, CTR0V and CTR1V are reset and thereby MSPORT is released.

According to this invention, priority determination for BS access and for MS access are independent and input port registers are also provided for each. Thereby, each access requesting unit can issue the next BS access request while the MS access is being carried out. Only two MS ports are provided for three access requesting units and they are used in common, and a particular MS port can also be used only for a particular access requesting unit when required. Accordingly, adequate priority can be determined for a large amount of processing in an access requesting unit.

We claim:

1. An access control processing system in a computer system having a buffer storage, a main storage and access requesting units which generates access requests for requested data, access being made to the main storage only if requested data is not found in the buffer storage, said access control processing system comprising:

buffer storage access request registers, each of said buffer storage access request registers operatively connected to one of the access requesting units, for storing access requests for the buffer storage;

a buffer storage priority determination circuit, operatively connected to the buffer storage and said buffer storage access request registers, for determining priority between access requests for the buffer storage;

main storage access request registers, operatively connected to said buffer storage and the buffer storage priority determination circuit, for storing access requests for the main storage;

a main storage priority determination circuit, operatively connected to the main storage, said buffer storage access request registers and said main storage access request registers, for determining priority between access requests for the main storage independently of the buffer storage priority determination circuit.

2. An access control processing system according to claim 1, wherein said computer system generates selection signals, wherein said main storage access request registers are used in common by the access requesting units, and further comprising means, operatively connected to said main storage access request registers and to receive the selection signals, for controlling one of said main storage access request registers so that only the access requests sent from a selected access requesting unit are stored in the one of said main storage access request registers.

3. An access control processing system according to claim 1, further comprising means, operatively connected to the buffer storage, said buffer storage priority determination circuit and said main storage registers, for clearing said buffer storage registers to permit new access requests to be accepted when the access requests stored in said buffer storage registers are stored in said main storage registers.

4. An access control processing system in a computer system having access requesting units, said access control processing system comprising:

common registers, operatively connected to the access requesting units, for holding access requests from the access requesting units;

a priority determination circuit, operatively connected to said common registers, for determining priority between the access requests from the access requesting units being held by said common registers; and setting means, operatively connected to said common registers, for setting at least one of said common registers as an exclusive register for holding the access requests from only one of the access requesting units.

5. An access control processing system in a computer system having buffer storage, main storage and access requesting units which generate access requests, said access control processing system comprising:

buffer storage access request registers, operatively connected to the access requesting units, for storing access requests;

a buffer storage priority determination circuit, operatively connected to the buffer storage and said buffer storage access request registers, for determining priority between access requests stored in said buffer storage registers;

processing means, operatively connected to the buffer storage and said buffer storage priority determination circuit, for processing the access requests and controlling said buffer storage priority determination circuit to permit said buffer storage access request registers to accept new access requests when the access requests stored in said buffer storage access request registers are processed; and a first main storage access request register, operatively connected to said processing means and the main storage, for storing main storage access requests requesting data which was not found in the buffer storage.

6. An access control processing system as recited in claim 5, further comprising a second main storage access request register, operatively connected to said processing means and the main storage, for storing main storage access requests requesting data which was not found in the buffer storage, and wherein the computer system generates a selection signal and said processing means comprises means, operatively connected to said first and second main storage access request registers and to receive the selection signal, for controlling which of said first and second main storage access request registers may be used by the main storage access requests from each of the access requesting units.

7. An access control processing system as recited in claim 5, wherein said processing means comprises:

a pipeline control system, operatively connected to said buffer storage priority determination circuit and said buffer storage, for processing the access requests;

a control circuit, operatively connected to said buffer storage priority determination circuit, said pipeline control system, said first main storage access request register and the buffer storage, for permitting new access requests to be accepted by said buffer storage access request registers and routing main storage access requests, requesting data not found in the buffer storage to said main storage access request registers, a loop-back register, operatively connected to said buffer storage priority determination circuit, said main storage priority determination circuit and said pipeline control system, for supplying said buffer storage priority determination circuit with the access requests which were selected by said buffer storage priority determination circuit but were not completely processed by said pipeline control system; and data registers, operatively connected to the access requesting units, said buffer storage, said main storage and said pipeline control system, for providing the access requesting units with the data requested by the access requests.

* * * * *